US012810212B1

(12) United States Patent
Martin et al.

(10) Patent No.: US 12,810,212 B1
(45) Date of Patent: Nov. 24, 2026

(54) TRAINING GENERATIVE MACHINE LEARNING MODELS USING SOURCE-LABELED DATASETS

(71) Applicant: Mistral AI SAS, Paris (FR)

(72) Inventors: Louis Martin, Marseilles (FR); Maximilian Augustin, Paris (FR); Paul Emmanuel Marcel Jacob, Paris (FR); Gunshi Gupta, London (GB)

(73) Assignee: Mistral AI SAS, Paris (FR)

( * ) Notice: Subject to any disclaimer, the term of this patent is extended or adjusted under 35 U.S.C. 154(b) by 0 days.

(21) Appl. No.: 19/635,578

(22) Filed: Mar. 31, 2026

(51) Int. Cl.
*G06N 20/00* (2019.01)
*G06N 3/08* (2023.01)
*G06N 3/09* (2023.01)
*G06N 5/02* (2023.01)

(52) U.S. Cl.
CPC ............... *G06N 20/00* (2019.01); *G06N 3/09* (2023.01); *G06N 5/02* (2013.01)

(58) Field of Classification Search
CPC ............... G06N 3/08; G06N 3/09; G06N 5/02
See application file for complete search history.

(56) References Cited

PUBLICATIONS

Khalifa, Muhammad, et al. "Source-aware training enables knowledge attribution in language models." arXiv preprint arXiv:2404.01019 (2024). (Year: 2024).*

Wang, Jingtan, et al. "Source attribution for large language model-generated data." arXiv preprint arXiv:2310.00646 (2023). (Year: 2023).*

Zong, Yongshuo, et al. "Safety fine-tuning at (almost) no cost: A baseline for vision large language models." arXiv preprint arXiv:2402.02207 (2024). (Year: 2024).*

Bill, Desirée, and Theodor Eriksson. "Fine-tuning a llm using reinforcement learning from human feedback for a therapy chatbot application." (2023). (Year: 2023).*

Martin et al., "Controllable Sentence Simplification", Facebook AI Research, Inria, Sorbonne Universit, Apr. 20, 2020.

* cited by examiner

*Primary Examiner* — Hal Schnee
(74) *Attorney, Agent, or Firm* — EIP US LLP

(57) ABSTRACT

A computer-implemented method for training a generative machine-learning model in a post-training stage includes receiving a training dataset comprising samples derived from a plurality of different data sources. A plurality of first samples in the training dataset are each associated with a respective source identifier indicating a data source of the respective first sample. The generative machine-learning model is trained by providing input prompts and the respective source identifiers of the first samples as inputs to the model. A respective loss is calculated for each first sample based at least in part on an output generated by the model and a corresponding response. Parameters of the generative machine-learning model are updated based at least in part on the respective losses. Related systems and non-transitory storage media are also disclosed.

20 Claims, 9 Drawing Sheets

TRAINING GENERATIVE MACHINE LEARNING MODELS USING SOURCE-LABELED DATASETS

TECHNICAL FIELD

This disclosure relates to training generative machine-learning models, and more particularly to techniques for training generative models using source-labelled training data.

BACKGROUND

Generative machine-learning models, such as large language models, are trained to produce outputs in response to input prompts. A widely used training approach is supervised fine-tuning (SFT), in which the model is trained on pairs of input prompts and corresponding desired responses. During SFT, the model learns to map inputs to outputs by minimising a loss computed over the response tokens, with parameters updated iteratively to bring the model's outputs closer to the desired responses in the training data.

In practice, training datasets for SFT are assembled from a range of distinct sources, each of which may differ in style, format, domain, or other properties. The composition of the training data has a direct bearing on the behaviour of the trained model, influencing the patterns it learns and the outputs it produces.

SUMMARY

Some techniques of the present disclosure comprise receiving a plurality of samples of (e.g., generated by a plurality of) different data sources, each sample comprising an input prompt and a corresponding response. A source-labelled dataset is generated by associating a respective source identifier token with each of a plurality of first samples, where each such token indicates the data source of that sample. A target training dataset is generated by associating a null identifier with a plurality of second samples that exhibit a target behaviour. A generative machine-learning model is then trained in a supervised fine-tuning stage using both datasets: the input prompts of the first samples are provided to the model together with their respective source identifier tokens, and the input prompts of the second samples are provided together with the null identifier. In some examples, a training mask may be applied to exclude, from loss calculation, token positions corresponding to the source identifier tokens. A respective loss is calculated for each sample based on the output generated by the model for that sample's input prompt and on the corresponding response, and the model's parameters are updated accordingly. Once trained, the model may be such that, at inference time, if an input associated with the null identifier is provided to it, the model generates an output exhibiting the target behaviour.

By associating explicit source identifier tokens with training samples from different data sources, the model may learn conditional distributions over source-specific behaviours rather than implicitly partitioning its latent space. This may prevent the rigid association of behaviours with particular input domains, for example so that desirable behaviours learned from one source are not siloed within the input domain associated with that source. By utilising the null identifier, for example with high-quality training samples exhibiting a desired behaviour, the model may be efficiently trained to learn the desired behaviour and apply it generally, decoupling responses from domain-specific behaviours in the training dataset. Moreover, using the null identifier for new training samples may allow the mode to learn new, generalised behaviours from a substantially smaller target dataset than may otherwise be possible, reducing the processor load, memory allocation, and computational cycles required to update the model relative to approaches that require full regeneration and retraining of large supervised fine-tuning datasets.

The source identifier tokens and the null identifier may be considered to act as functional data structures. During the supervised fine-tuning stage, the training algorithm automatically processes these identifiers to drive how the machine-learning model updates its internal parameters. In examples where a training mask is applied to exclude the source identifier tokens from the loss calculation, the techniques herein may cause the model to learn conditional distributions based on the identifiers, rather than updating its weights to generate the identifiers themselves. Consequently, in inference, the data structure of the inference input prompt (e.g., a specific source identifier or the null identifier) may direct how the computer, using the model, processes data and generates responses.

In some examples, the techniques of the present disclosure may further perform reinforcement learning on the trained generative machine-learning model using a plurality of output sequences generated by providing inputs associated with the null identifier to the trained model. By performing source-conditioned supervised fine-tuning prior to reinforcement learning, the model may retain a higher token-distribution diversity at the start of the reinforcement learning stage, enabling broader exploration of the output space and a stronger training signal.

In some examples, the plurality of different data sources may comprise one or more of: human annotation (e.g., in general, or specific human annotators); a source model; or a source model class.

In some examples, the total number of samples in the target training dataset may be fewer than the total number of samples in the source-labelled training dataset. By disentangling task capabilities from source-specific priors during training on the source-labelled dataset, the model may be able to adapt to the target behaviour using a comparatively small number of samples associated with the null identifier, reducing computational resources required to achieve the desired behaviour across multiple input prompt domains.

In some examples, the null identifier may comprise a null identifier token or an absence of a source identifier token. By permitting the null identifier to be represented as the absence of any source identifier token, the trained model can operate at inference time without any source prefix being supplied, reducing the data length required of a prompt to trigger the desired behaviour.

Techniques of the present disclosure may comprise receiving a training dataset comprising samples generated by or derived from a plurality of different data sources, each sample (in at least some examples) comprising an input prompt and a corresponding response. The training dataset may comprise a plurality of first samples each associated with a respective source identifier indicating the data source of that sample. A generative machine-learning model may be trained (e.g., in a post-training stage, such as in a supervised fine-tuning stage) using the training dataset, wherein the input prompt of each first sample is provided to the model together with its respective source identifier. A respective loss may be calculated for each first sample based on the output generated by the model for that sample's input prompt and, at least examples using SFT, on the corresponding response. The model's parameters may be updated based on such losses.

In some examples, the training dataset may further comprise a plurality of second samples each associated with a null identifier, where the second samples are associated with one or more target behaviours, and the model is additionally trained using those second samples. By training the model on samples associated with a null identifier alongside source-labelled samples, the model may learn a target behavioural mode that is not tied to any specific source distribution, enabling the model to apply desired general behaviours across all input domains at inference time without requiring any source prefix to be supplied.

In some examples, the method further comprises receiving a subsequent training dataset comprising a plurality of subsequent samples, associating an identifier with those subsequent samples, and further training the already-trained model using the subsequent training dataset, e.g., to condition the model's outputs on that identifier. In some examples, the total number of samples in the subsequent training dataset may be fewer than the total number of samples in the original training dataset. Because the model has already learned to disentangle task capabilities from source-specific priors during training on the larger source-labelled dataset, the model may be further trained to associate a new identifier with a new behavioural distribution using a substantially smaller subsequent dataset, avoiding the expense of regenerating or modifying the existing training mixture.

In some examples, the identifier used in this further training stage may be or comprise the null identifier. By associating the subsequent samples with the null identifier, the model may rapidly learn a new default target behaviour without requiring any change to the inference-time input format.

Some examples may comprise performing reinforcement learning on the trained model using an output sequence generated by providing an input associated with the null identifier or a target source identifier to the trained model. By conditioning the trained model on the null identifier when generating rollouts for reinforcement learning, the higher output token entropy preserved by source-conditioned supervised fine-tuning is leveraged, providing broader coverage of the output space during rollout generation and thereby producing a stronger training signal compared to rollouts generated from a model that has collapsed to a single locked mode. For example, using the null identifier may provide outputs representing properties of multiple different input domains represented in the SFT training data.

Some examples may include a particular source identifier with a prompt for reinforcement learning, for example where it is desired to trigger outputs within a particular domain.

In some examples, the one or more target behaviours may comprise one or more of: an instruction-following behaviour; a target output tone; a target safety profile; an output verbosity level; a reasoning behaviour; or an output formatting constraint.

In some examples, training the model using the plurality of second samples may comprise either training the model using a mixture comprising both the first samples and the second samples; or subsequently training the model using the second samples after training the model using the first samples.

In some examples, training the model may comprise applying a training mask to exclude, from loss calculation, one or more token positions corresponding to the respective source identifiers, calculating a respective loss for each of the first samples and each of the second samples, and updating the model's parameters based on those losses. By applying a training mask in this way, gradient updates may be driven by the quality of the model's response predictions rather than by its ability to predict source identifier tokens, preserving the integrity of the conditional training objective.

In some examples, each source identifier may comprise one or more of: a token prepended to, appended to, or embedded within an input prompt of a corresponding first sample; a system-role instruction; a metadata tag; a control variable; or a latent embedding. In some examples, each source identifier may indicate one or more of: the identity of a specific machine-learning model; the identity of a specific human annotator; a human-derived data category; a class of machine-learning models sharing a target capability or distribution characteristic; a descriptive persona defining a behavioural profile of the data source; a data quality tier; or a generation parameter defining an output tone or verbosity.

Further techniques of the present disclosure may comprise receiving an input prompt associated with a null identifier (or alternatively a particular source identifier). Such an input prompt may be processed by a generative model trained by any example of the techniques discussed above or herein. The model may generate an output exhibiting a target behaviour.

In some examples, the input prompt may correspond to a specific data domain that is associated with a first behaviour in the training dataset, and processing the input prompt using the model may generate an output exhibiting the target behaviour in place of the first behaviour. Because the model has learned during source-conditioned supervised fine-tuning to disentangle task capabilities from source-specific behavioural priors, conditioning on the null identifier at inference time may cause the model to apply the target behaviour even when the input prompt corresponds to a domain previously associated with a different source-specific behaviour, without requiring the domain-specific training data to be regenerated or modified.

BRIEF DESCRIPTION OF THE DRAWINGS

Examples of the present disclosure will now be described with reference to the accompanying drawings.

DETAILED DESCRIPTION

Introductory Discussion and Terminology

Figure 1:
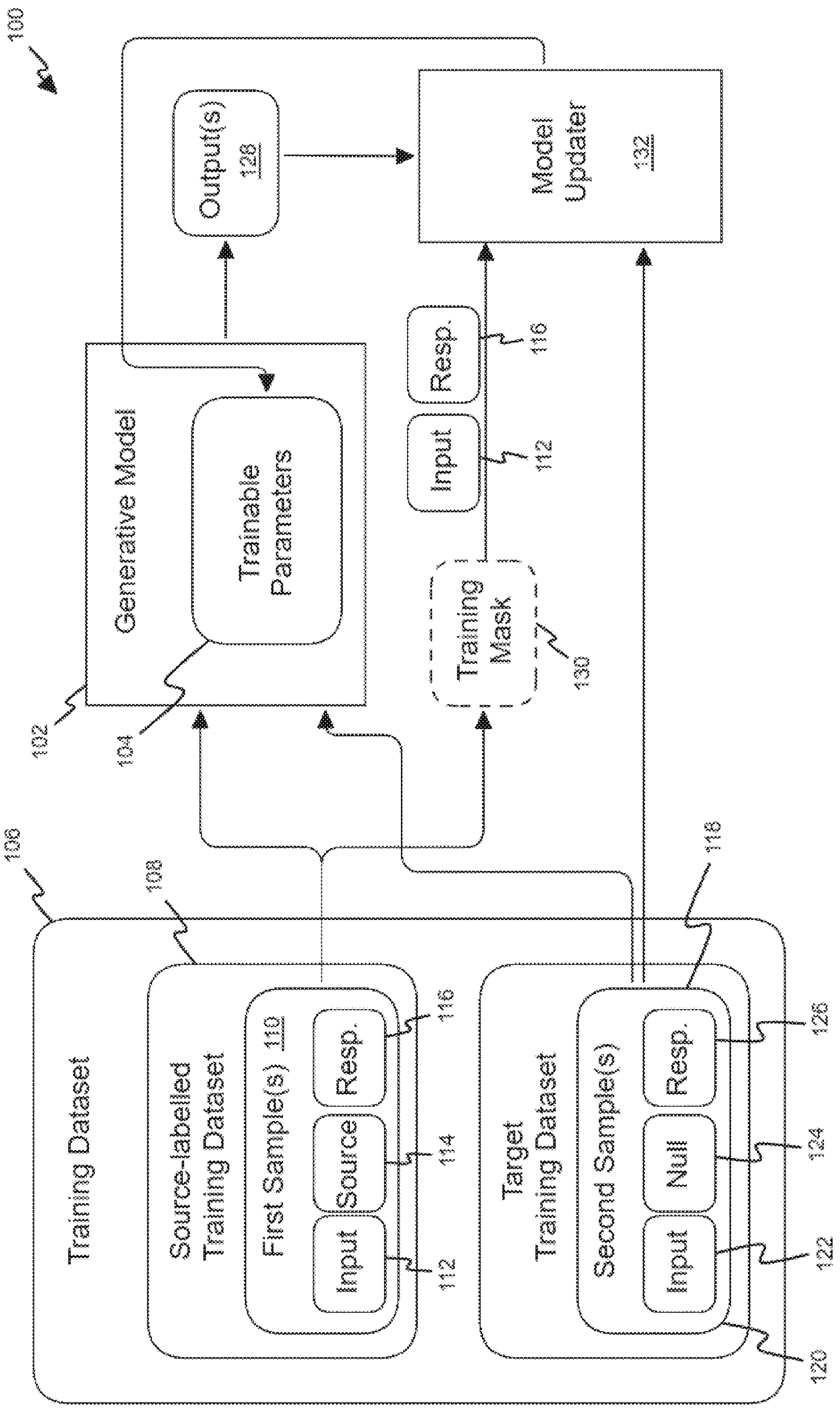
FIG. 1 is a block diagram showing a system for training a generative machine-learning model using source-conditioned supervised fine-tuning.

The present disclosure relates to the training of a generative machine-learning model. The generative machine-learning model may be a large language model (LLM) or small language model (SLM), and may have a decoder-only transformer architecture or any other suitable neural network architecture, such as an encoder-decoder transformer, Mamba, or a diffusion language model architecture. The generative machine-learning model may be an instance of an LLM developed by Mistral AI SAS®, such as an LLM in the Codestral, Devstral, Magistral, Mixstral, Mistral Large, Mistral Small, Ministral, or Mistral (Dense) model families.

The generative machine-learning model has a set of trainable parameters whose values may be updated during training of the generative machine-learning model. For example, where the generative machine-learning model includes a transformer, the generative machine-learning model may have trainable parameters for a token embedding matrix, and a set of transformer blocks (for example projection matrix values and feed forward network weights and biases), and optionally learned positional embeddings. The generative machine-learning model may also have fixed hyperparameters whose values are not expected to change during training.

The generative machine-learning model may take sequences of tokens as inputs and generate further sequences of tokens as outputs. The generative machine-learning model may generate the output tokens in an auto-regressive manner, such that a given output token may be generated in dependence on the sequence of input tokens and any output tokens generated before the given output token. The tokens may correspond to natural language words or segments of words, and may include functional tokens, system-role instructions, or metadata tags. The generative machine-learning model may be a multi-modal model capable of processing different modalities such as images, audio, or video as inputs and as outputs, alongside text data. The generative model may be a reasoning model, arranged to generate sequences of "chain of thought (COT) tokens" before returning an output sequence of tokens.

The generative machine-learning model may have been pretrained on large-scale datasets, and may be further trained or fine-tuned in one or more post-training stages using techniques including supervised fine-tuning (SFT) and reinforcement learning (for example Direct Preference Optimization (DPO), Proximal Policy Optimization (PPO), or Group Relative Policy Optimization (GRPO)). The methods described within the present disclosure relate in at least some examples to training the model in post-training stage, such as a supervised fine-tuning stage, or reward model/preference training stage, using heterogeneous datasets comprising samples from multiple different data sources. A data source may for example refer to a specific synthetic teacher model, a specific human annotator, or a broader class of models or humans sharing common characteristics, or generally any source or originator of a training data sample.

Source-Conditioned Post-Training

As discussed above, generative models such as large language models may be trained using supervised fine-tuning (SFT) datasets that are highly heterogeneous. A typical SFT mixture may for example combine synthetic data generated by multiple different teacher models (e.g., Mistral Large, Codestral) alongside data curated by various human annotators. Each of these data sources may exhibit unique behavioural traits, distributions, and strengths. For example, one source may excel at complex reasoning but produce overly verbose outputs, while another may provide concise, high-quality code but lack appropriate conversational tone or safety guardrails.

During standard SFT, the model may implicitly attempt to marginalize over these latent sources, learning to associate specific behaviours with specific input domains. For example, let D be a heterogeneous instruction tuning dataset. The data may be generated by a mixture of latent sources $z \in \mathcal{Z}$, where each source defines a joint distribution over inputs x and outputs y. The model in standard SFT may learn a policy $\pi_\theta(y|x)$ that implicitly marginalizes over these latent sources:

$$\pi_\theta(y \mid x) = \sum_{z=\mathcal{Z}} p(y \mid x, z) p(z \mid x)$$

where p (z|x) represents the model's internal estimation of which "mode" or source the input x belongs to.

This implicit partitioning may result in "mode locking," where the model rigidly correlates a set of behaviours (such as tone, safety, or verbosity) exclusively with a particular task or domain. For instance, if a user provides a coding prompt, a mode-locked model may successfully enter a "coding mode" to solve the problem, but in doing so, may defaults entirely to the tone and style dominant in the coding-specific training data. Consequently, the model may forget or ignore desirable alignment behaviours, such as instruction-following, polite tone, or safety constraints, that it successfully learned from other, non-coding data sources.

Such mode locking may present a significant scalability problem. As new, desirable behaviours are identified, it can be prohibitively expensive to regenerate an entire massive SFT dataset to ensure the new behaviour is perfectly distributed across all domains. Naively adding a small batch of new data exhibiting the desired behaviour may fail: the model may either learn it as an isolated, narrowly triggered new mode or may experiences unpredictable regressions across its existing capabilities. Furthermore, mode locking may artificially collapse the output token diversity (entropy) of the model. This collapse may limit the model's ability to explore different response trajectories during subsequent reinforcement learning stages, reducing the effectiveness of algorithms like Direct Preference Optimization (DPO).

The present disclosure provides methods and systems which may condition the generative machine-learning model on source-specific distributions during training, for example enabling the model to learn conditional distributions that disentangle task capabilities from source-specific priors.

FIG. 1 is a block diagram illustrating such a system 100 for training a generative machine-learning model 102 using, for example, source-conditioned post-training, e.g., SFT. The system 100 explicitly labels training data distributions according to their originating data sources, for example converting what would otherwise be a latent, unobserved source variable into an explicit, observed control variable. This explicit conditioning may allow the generative model 102 to disentangle task capabilities from source-specific priors, which may prevent mode locking and preserve output token diversity for subsequent stages of training such as reinforcement learning.

The generative model 102 is a machine-learning model capable of generating sequences of tokens in response to an input. In the illustrated example the generative model 102 is a large language model, though other architectures are equally applicable. For example, the generative model 102 may be a small language model, a decoder-only transformer, an encoder-decoder transformer, or a diffusion language model. More broadly, the generative model 102 need not be restricted to text modalities; analogous source-conditioning approaches may be applied to generative models operating over other modalities, such as audio, image, or multimodal inputs, where heterogeneous training data similarly gives rise to distinct source distributions.

The generative model 102 comprises trainable parameters 104, which represent the internal weights of the model. It is these parameters 104 that are updated during the supervised fine-tuning stage. The generative model 102 receives input prompts and produces outputs 128 comprising sequences of tokens generated in response to those inputs. Although shown as a single block, the outputs 128 may comprise respective outputs to one or more first samples 110 and/or one or more second samples 120, each output representing the model's response to receiving the respective input prompt together with its associated source identifier token 114 or null identifier token 124.

The training dataset 106 is a heterogeneous dataset comprising samples drawn from a plurality of different data sources. Data sources may include, for example, synthetic teacher models such as Mistral Large, Codestral, Mistral Medium, or Magistral; human annotators providing labelled responses; specific expert annotators; or broader classes of source model, such as code-specialised models or general-purpose chat models. Because each data source may exhibit its own characteristic distribution over outputs, e.g., reflecting differences in tone, verbosity, instruction-following style, reasoning depth, and other behavioural attributes, the training dataset 106 as a whole may be heterogeneous in nature.

The source-labelled dataset 108 is generated from the training dataset 106 by explicitly associating a respective source identifier token 114 with each of a plurality of first samples 110. This process may convert the latent source variable, which a model trained without such labelling may be forced to infer implicitly from the input distribution, into an observed control variable that is made directly available to the model during training. In some examples, the source-labelled dataset 108 may be generated by the system 100 itself by prepending, inserting, or otherwise associating source identifier tokens 114 to existing training samples. In other examples, the data may be received already annotated with source identifiers, in which case generating the source-labelled dataset 108 may comprise receiving or processing data that already carries such labels.

Each first sample 110 is an individual training instance within the source-labelled dataset 108, comprising in the illustrated example an input prompt 112, a source identifier token 114, and a corresponding response 116. The input prompt 112 contains for example the user query, instruction, or context provided to the generative model 102 for that sample. The input prompt 112 is primarily described herein as a text sequence, but in other examples it may comprise other modalities, such as images, audio segments, or structured data, or representations thereof, either alone or in combination with text.

The source identifier token 114 represents the originating data source of the first sample 110. In the illustrated example, the source identifier token 114 is implemented as one or more tokens prepended, appended, or otherwise inserted into to the input prompt 112, for example forming a prefix that is presented to the generative model 102 as part of the input. Other implementations are equally contemplated. For example, the source identifier token 114 may be a token or sequence of tokens appended to, or embedded within, the input prompt 112. In further examples, the source identifier may be implemented as a system-role instruction, a metadata tag, an observed control variable, or a latent embedding injected into the model's internal representations. The source identifier token 114 may indicate, for example: the identity of a specific machine-learning model that generated the sample (such as a named teacher model); the identity of a specific human annotator; a human-derived data category; a class of machine-learning models sharing common characteristics (such as code-specialised models); a descriptive persona; a data quality tier; or a generation parameter defining output tone or verbosity. By way of specific example, the source identifier token 114 may comprise a string tag such as [Source Identifier]. In conversational or chat-formatted datasets, this tag may be injected directly into a system prompt (e.g., formatted as { . . . "content": "[Source Identifier] . . . ) In some examples, the source-labelled dataset 108 comprises first samples 110 from multiple different sources, each associated with a distinct source identifier token 114, so that the generative model 102 is exposed to a plurality of explicitly delineated source distributions during training.

In further examples, multiple distinct data sources may be intentionally grouped and assigned the same source identifier token 114 to merge their distributions into a single, broader category. For instance, outputs from a variety of older source models that share a similar, outdated style may all be grouped under a single [old_tone] identifier, while outputs from newer, preferred models may be grouped under a [new_tone] identifier. This may allow developers to retain the factual knowledge or reasoning capabilities present in the older data without forcing the model to learn a unique distribution for every deprecated model version. It may also allow developers to control the overall ratio of preferred [new_tone] behaviour to [old_tone] behaviour during training, for example smoothly deprecating older models into the [old_tone] bucket as new models are introduced. In other examples, data sources may be grouped into classes based on shared behavioral strengths or weaknesses (such as tone, reasoning ability, or instruction-following), data quality or origin (such as human-reviewed, expert-generated, or synthetic), or task capabilities (such as coding, language detection, long context handling, or function calling), allowing the generative model 102 to learn a unified conditional distribution for these shared characteristics, regardless of which specific model or annotator generated the data. As an example, multiple different models that are specialized for coding tasks may all be grouped under a single [code_specialist] identifier, allowing the generative model 102 to learn a unified conditional distribution for coding capabilities, regardless of which specific coding model generated the data.

The corresponding response 116 is the desired output associated with the input prompt 112 of a given first sample 110. It may represent the ground-truth target that the generative model 102 is trained to produce for that input, and may have been generated by the specific data source identified by the source identifier token 114. The corresponding response 116 may be used in the supervised fine-tuning loss calculation.

The target training dataset 118 is a dataset comprising a plurality of second samples 120, each of which exhibits one or more target behaviours. Target behaviours may include, for example, an instruction-following behaviour, a target output tone, a target safety profile, an output verbosity level, a reasoning behaviour, or an output formatting constraint. The target training dataset 118 may be used to synthesise a generalised mode that combines desirable behaviours from across the source distributions, a "best-of-all-worlds" mode, or to adapt the generative model 102 to new behaviours not well-represented in the existing source-labelled dataset 108. In some examples, the total number of samples in the target training dataset 118 may be fewer than the total number of samples in the source-labelled dataset 108. For example, the target training dataset 118 may comprise on the order of thousands to tens of thousands of samples, whereas the source-labelled dataset 108 may comprise millions of samples. The target training dataset 118 may be generated by selecting high-quality samples from the training dataset 106 that exhibit the target behaviour and associating them with the null identifier token 124, or it may be received as a pre-constructed dataset. In some examples, the second samples 120 may be selected by identifying samples that best represent the desired target behaviour, for instance by filtering for high-quality outputs, human-reviewed responses, or outputs from a particularly capable source model.

Each second sample 120 is an individual training instance within the target training dataset 118, comprising a second sample input prompt 122, a null identifier token 124, and a second sample response 126. The null identifier token 124 is associated with the second sample 120 in place of a source-specific identifier, signalling to the generative model 102 that this sample belongs to the target mode. The null identifier token 124 may be implemented as an explicit null token or a fixed token sequence prepended to (or appended to or inserted within) the second sample input prompt 122. Alternatively, the null identifier may be the absence of any source identifier token—that is, an empty prefix-which the model may learn to treat as a distinct class in its own right. Other implementations may include a system-role instruction, a metadata tag, an observed control variable, or a latent embedding. By training on second samples 120 associated with the null identifier token 124, the generative model 102 may learn that the presence of the null identifier, e.g., absence of a source-specific prefix, corresponds to a neutral or unlocked state. This may allow the model, at inference time, to apply general alignment behaviours, such as instruction following, tone control, or safety constraints, across all input domains, without being constrained by the priors of any particular source distribution. The second sample response 126 may be the ground-truth output of the second sample 120, exhibiting the target behaviour, and may be used in the supervised fine-tuning loss calculation for that sample.

In some examples, an optional training mask 130 may be applied during training (e.g., post-training) stage to exclude specific token positions from the loss calculation. For example, the training mask 130 may exclude the token positions corresponding to the source identifier tokens 114, so that the generative model 102 does not receive gradient updates with respect to those prefix tokens. This may ensure that the model is trained to predict the response tokens conditioned on the source identifier, rather than to predict the source identifier itself, which would be undesirable. In the illustrated example, the training mask 130 is shown applied to the first samples 110 passing through it on their way to the model updater 132. In practice, the training mask 130 may be implemented for example as a binary mask over the token sequence, setting the loss contribution of masked positions to zero before aggregating the per-token losses. In other words, the training mask 130 may actually be incorporated into the operations represented by the model updater 132. Furthermore, in some examples, the training mask 130, or a further mask, may also be applied to the second samples 120 to mask the null identifier token 124. However, where the null identifier is implemented as the absence of an identifier token rather than an explicit token, it may not be necessary to apply a training mask to the second samples 120 specifically to hide the null identifier, since there is no prefix token present at those positions.

The model updater 132 is a component or logical block responsible for determining the loss for each training sample and computing the corresponding updates to the parameters 104 of the generative model 102. For each (or multiple) first sample(s) 110, the model updater 132 may compute a loss based on the output 128 generated by the generative model 102 in response to the input prompt 112 and source identifier token 114 of that sample, relative to the corresponding response 116. For each (or multiple) second sample(s) 120, the model updater 132 may compute a loss based on the output 128 generated in response to the second sample input prompt 122 and null identifier token 124, relative to the second sample response 126. By conditioning training on the source, the optimization objective may change from learning a marginal distribution as in standard SFT, to a learning a conditional distribution of the form:

$$\mathcal{L}_{Cond}(\theta) = -\mathbb{E}_{(x,y,c)\sim\mathcal{D}}[\log\pi_\theta(y \mid x, c)]$$

This equation expresses the training objective as the expected negative log-probability of generating the correct response y given input x and conditioning variable c, averaged over all samples in the dataset $\mathcal{D}$. For first samples 110, the conditioning variable c is the source identifier token 114; for second samples 120, it is the null identifier token 124 (or its absence). The dataset $\mathcal{D}$ may represent a combination of first and second sources where the model 102 is trained concurrently on both sets. Alternatively, $\mathcal{D}$ may represent the source labelled training data set 108 only, in examples where the model 102 is first trained using only the first samples 110. In such cases, the model 102 may be trained in a subsequent training operation using the second samples 120, using a similar loss form, with $\mathcal{D}_{new}$ as the dataset representing the target training dataset 118.

The model updater 132 and the generative model 102 interact bidirectionally: the generative model 102 produces outputs 128 in response to input prompts, and the model updater 132 uses those outputs 128 together with the corresponding responses to compute losses and update the parameters 104 of the generative model 102, which in turn affects the outputs 128 produced in subsequent forward passes. Parameters 104 are updated, for example, via gradient descent or a variant thereof such as Adam, with gradients computed by backpropagation through the token positions not excluded by the training mask 130.

Once training is complete, the trained generative model 102 may be configured to receive, at inference time, inputs associated with the null identifier token 124, and to generate outputs exhibiting the target behaviour. Because the model has learned during training to disentangle source-specific priors from task capabilities, the null identifier token 124 may act as a neutral state that enables the model to apply generalised, high-level alignment behaviours across all input domains, irrespective of whether those domains were previously associated with a particular source distribution during training. Alternatively or additionally, an inference input may be associated with a specific source identifier token, for example where it is desired to trigger behaviours associated with a specific input domain. As a non-limiting example, an inference system may determine that an input prompt relates to coding, and so may associate the prompt with a coding source identifier to yield an output exhibiting behaviour(s) shown by coding source training data.

In some examples, as discussed further below, following the supervised fine-tuning stage, reinforcement learning may be performed on the trained generative model 102. A plurality of output sequences may be generated by providing inputs associated with the null identifier token 124 to the trained generative model 102, and these output sequences may be used as rollouts for the reinforcement learning stage. Because source-conditioned supervised fine-tuning preserves the diversity of the output token distribution by preventing the model from collapsing prematurely to a single source's narrow distribution, the rollouts generated under the null identifier token 124 may exhibit higher token entropy than those produced by a model trained without source conditioning. This broader coverage of the output space may provide a richer training signal during reinforcement learning, enabling the reinforcement learning algorithm, such as DPO, PPO, GRPO, or oDPO, to identify and reinforce optimal trajectories that may combine the reasoning capabilities of one source mode with the tone or style of another, rather than being constrained to the local optima of a single locked mode.

Method of Source-Conditioned Post-Training

Figure 2:
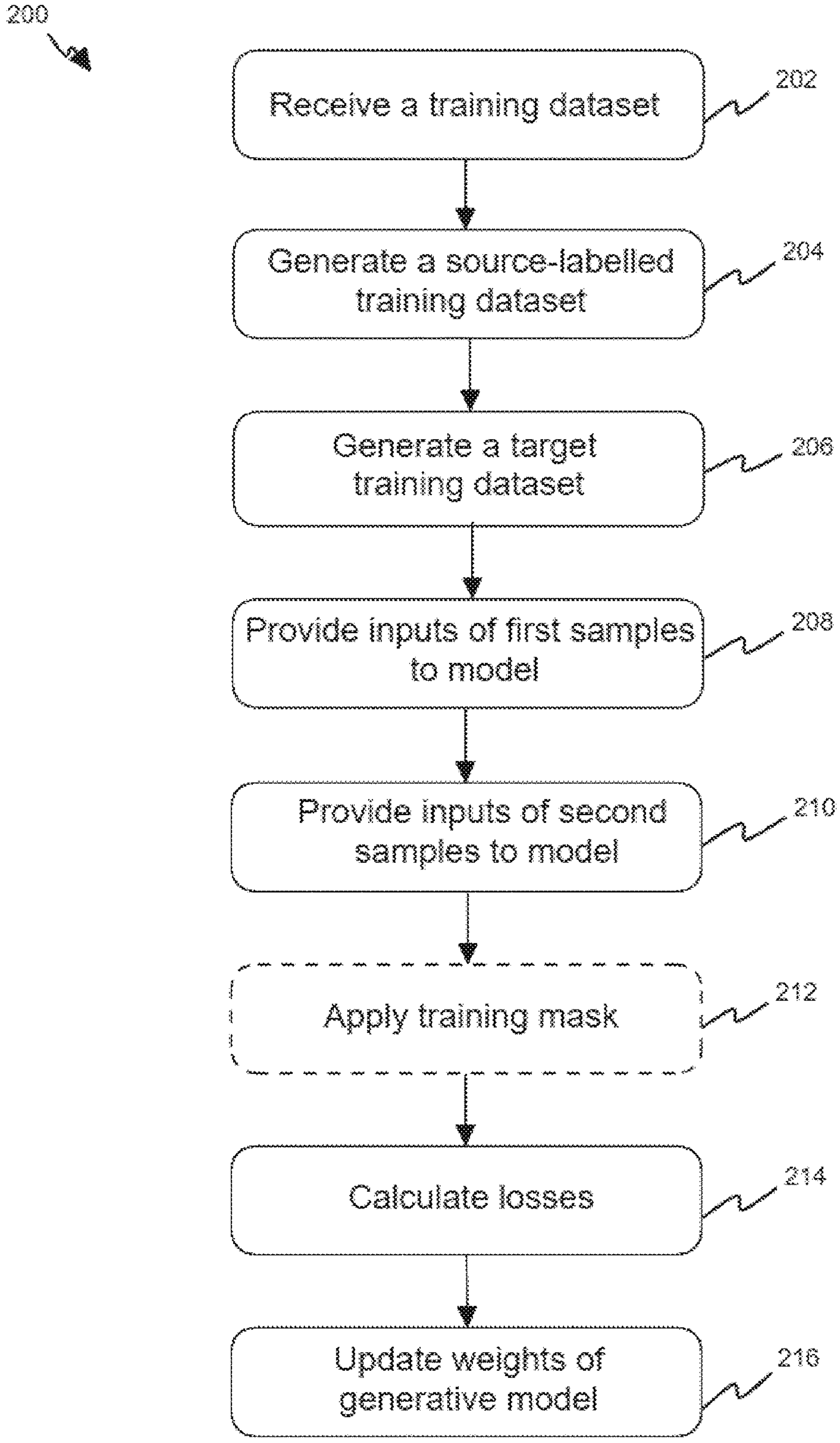
FIG. 2 is a flow diagram showing a method for training a generative machine-learning model using source-conditioned supervised fine-tuning.

FIG. 2 is a flowchart illustrating a computer-implemented method 200 for training a generative machine-learning model. The method steps shown in FIG. 2 correspond to the operations performed by the system 100 described in connection with FIG. 1, and the components introduced in that description, including the generative model 102, the source-labelled dataset 108, the target training dataset 118, the training mask 130, and the model updater 132, are equally applicable here. The method 200 may be implemented on a computer system comprising one or more processors and associated memory, as a computer program comprising instructions that, when executed by one or more processors, cause the processors to carry out the steps described below; or as (e.g., non-transitory) computer-readable media storing such instructions, or as a computer program comprising instructions which, when executed, cause a computer to perform the operations.

At Block 202, the method 200 comprises receiving a training dataset comprising a plurality of samples generated by or derived from a plurality of different data sources. Each sample of the plurality of samples comprises an input prompt and a corresponding response. The data sources may include, for example, synthetic teacher models, human annotators, or specific expert annotators, as described in connection with the training dataset 106 of FIG. 1. Because each data source exhibits its own characteristic output distribution, the training dataset as a whole may be heterogeneous in nature.

At Block 204, the method 200 comprises generating a source-labelled training dataset by associating a respective source identifier token with each of a plurality of first samples of the training dataset. Each respective source identifier token indicates the respective data source of the first sample with which it is associated. As described in connection with the source-labelled dataset 108 and source identifier token 114 of FIG. 1, the source identifier token may be implemented as one or more tokens prepended to, appended to, or embedded within the input prompt of the first sample, or alternatively as a system-role instruction, a metadata tag, an observed control variable, or a latent embedding.

At Block 206, the method 200 comprises generating a target training dataset by associating a null identifier with a plurality of second samples of the training dataset. The plurality of second samples exhibit a target behaviour, which may comprise, for example, an instruction-following behaviour, a target output tone, a target safety profile, an output verbosity level, a reasoning behaviour, or an output formatting constraint. As described in connection with the target training dataset 118, the null identifier token 124, and the second samples 120 of FIG. 1, the null identifier may be implemented as an explicit null token or fixed token sequence, or as the absence of any source identifier token. Other implementations include a system-role instruction, a metadata tag, an observed control variable, or a latent embedding.

At Block 208, the method 200 comprises providing the input prompts of each of the plurality of first samples, including the respective source identifier tokens, as inputs to the generative machine-learning model. This corresponds to the step in which the first samples 110, each comprising an input prompt 112 and an associated source identifier token 114, are presented to the generative model 102 as described in connection with FIG. 1. The model processes each such input and produces a corresponding output.

At Block 210, the method 200 comprises providing the input prompts of each of the plurality of second samples, including the null identifier, as inputs to the generative machine-learning model. This corresponds to the step in which the second samples 120, each comprising a second sample input prompt 122 and an associated null identifier token 124, are presented to the generative model 102. By receiving inputs associated with the null identifier alongside inputs associated with source-specific identifiers, the model is exposed during training to the full range of source distributions as well as the target mode.

At Block 212, the method 200 optionally comprises applying a training mask to exclude, from the loss calculation, the token positions corresponding to the respective source identifier tokens. As described in connection with the training mask 130 of FIG. 1, this ensures that the generative machine-learning model receives no gradient signal with respect to the source identifier token positions, so that its parameters are updated solely on the basis of the response tokens conditioned on those identifiers. In some examples, a corresponding mask is also applied to the null identifier token positions of the second samples 120 where the null identifier is implemented as an explicit token rather than the absence of a prefix.

At Block 214, the method 200 comprises calculating a respective loss for each of the plurality of first samples and each of the plurality of second samples. The respective loss for a given sample is based on the output generated by the generative machine-learning model for the input prompt of that sample compared against the corresponding ground-truth response of that sample. The loss may be the same as the loss discussed above in relation to FIG. 1. In practice, losses may be computed and parameter updates are applied over batches of samples.

At Block 216, the method 200 comprises updating the parameters of the generative machine-learning model based on the loss. As described in connection with the model updater 132 and parameters 104 of FIG. 1, parameter updates may be computed by backpropagation through the token positions not excluded by the training mask.

Training System for Source-Conditioned Post-Training

Figure 3:
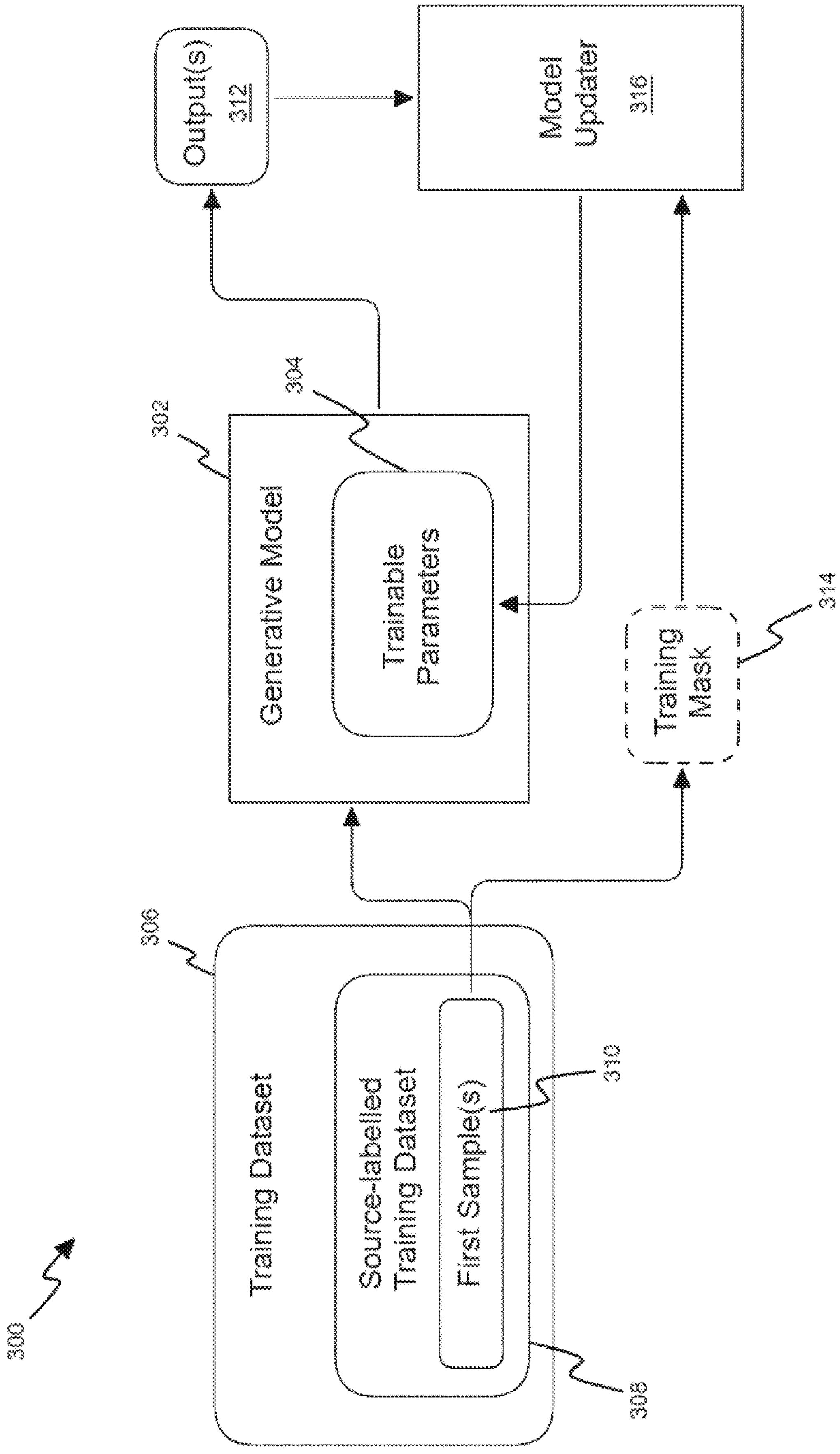
FIG. 3 is a block diagram showing a further system for training a generative machine-learning model using source identifiers.

FIG. 3 is a block diagram showing an alternative system 300 for training a generative machine-learning model using source-conditioned supervised fine-tuning. The system 300 illustrates a generalised training architecture, of which the system 100 of FIG. 1 may be considered an example. FIG. 3 may be understood in the context of the broader training pipeline described in connection with earlier figures, and components that are the same as or substantially similar to those described previously are not repeated in full here. The system 300 is described primarily in the context of post-training stage, such as supervised fine-tuning, though the same or analogous techniques may be applied to other training processes, as discussed further below.

The generative model 302 comprises a set of trainable parameters 304 that are updated during training. The generative model 302 may be any suitable generative machine-learning architecture, including large language models, small language models, decoder-only transformer architectures, encoder-decoder transformer architectures, or diffusion language models. The generative model 302 receives input prompts drawn from the training dataset 306 and produces corresponding outputs 312, which are passed to the model updater 316 for use in computing a training loss and updating the trainable parameters 304.

Furthermore, the generative model 302 may be trained as an evaluation model, such as a reward Model or a chain-of-thought reward model used to score the outputs of other models. In such examples, the training dataset 306 may comprise evaluation data from different sources, such as concise human-generated evaluations versus lengthy, synthetic reasoning traces generated by a separate model. By associating these distinct evaluation data types with different source identifiers, the generative model 302 can learn a clear latent direction distinguishing the two evaluation modes, allowing it to subsequently evaluate outputs using the preferred reasoning style without the distinct evaluation modes collapsing into a poorly performing mixture.

The training dataset 306 is a heterogeneous dataset comprising samples drawn from a plurality of different data sources. The training dataset 306 in this example comprises a source-labelled training dataset 308 containing training samples for which a source identifier has been associated. The first samples 310 are the individual training instances within the source-labelled training dataset 308. In examples where the technique is applied to supervised fine-tuning, each first sample 310 comprises an input prompt and a corresponding response. In other examples, where the technique is applied to processes other than supervised fine-tuning, the dataset may not comprise response completions. The first samples 310 have the same or substantially the same form as the first samples 110 discussed above, including any alternative implementations.

The training mask 314 is an optional component of the system 300. Where present, the training mask 314 identifies the token positions within each input sequence that correspond to the source identifier tokens and excludes those positions from the loss calculation performed by the model updater 316. The training mask 31 may have the same or substantially the same form as the training mask 130 discussed above, including any alternative implementations.

The model updater 316 receives the outputs 312 produced by the generative model 302 in response to each input prompt, together, in SFT at least, with the corresponding target responses from the training dataset 306 and, where applicable, the masking information from the training mask 314. The model updater 316 computes a loss based on the generated output and the corresponding target response for each or multiple inputs. The model updater 316 then updates the trainable parameters 304 of the generative model 302 based on the computed losses. The model updater 316 may operate similarly to model updater 132 discussed above.

Method Steps for Source-Conditioned Supervised Fine-Tuning

Figure 4:
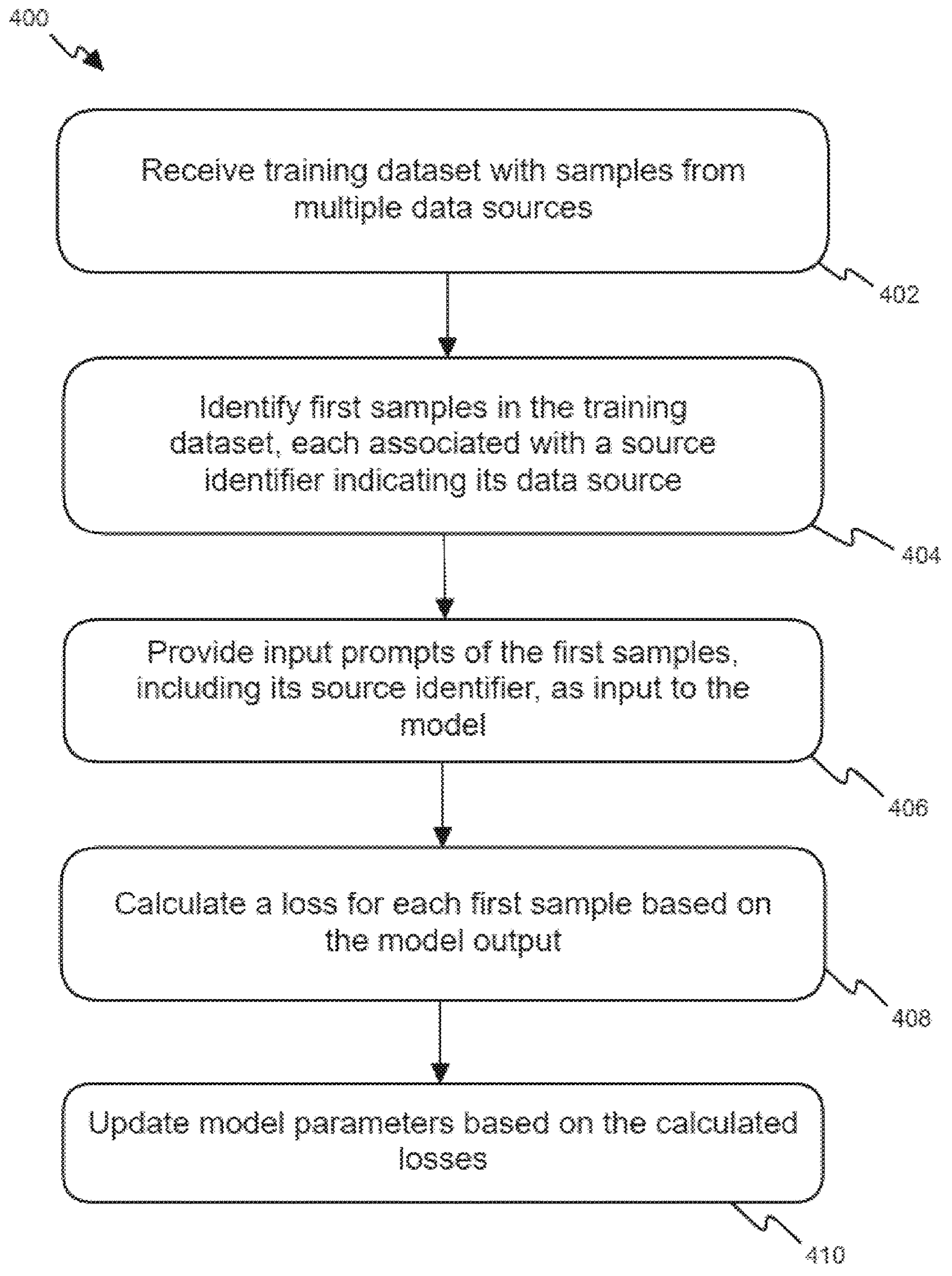
FIG. 4 is a flow diagram showing a further method for training a generative machine-learning model using source identifiers.

FIG. 4 is a flow diagram illustrating a computer-implemented method 400 for training a generative machine-learning model using source-conditioned supervised fine-tuning, corresponding to the operations performed by the system 300 described in connection with FIG. 3. The method 400 may be implemented on a computer system comprising one or more processors and associated memory, as a computer program stored on a computer-readable medium, or as a combination of hardware and software components. The method 200 discussed above may be considered an example of the method 400.

At Block 402, a training system receives a training dataset comprising a plurality of samples generated by or derived from a plurality of different data sources. At Block 404, the training system may identify first samples within the training dataset and associate a respective source identifier with each. In some examples, Block 404 may be omitted where the first samples are received at Block 402 with source identifiers already associated, such that no separate identification or association step is required. Block 402 and 404 may comprise operations similar to operations 202 and 204 discussed above.

At Block 406, the training system provides the input prompt of each first sample, including its respective source identifier, as an input to the generative machine-learning model. This may be part of a post-training stage, such as a supervised fine-tuning training stage. At Block 408, the training system calculates a loss for the first samples. The loss for a given first sample may be based on the output generated by the generative machine-learning model in response to the input prompt of that first sample compared against a corresponding ground-truth response associated with that first sample in the training dataset.

At Block 410, the training system updates the trainable parameters of the generative machine-learning model based on the loss(es) calculated at Block 408. Block 406, 408, and 410 may comprise operations similar to operations 208, 214, and 216 discussed above.

The operations of method 400 may be repeated for multiple samples. In some cases, loss and/or model updating may be performed on batches of samples.

Target Behaviour Adaptation Via Null-Prefix Conditioning

Figure 5:
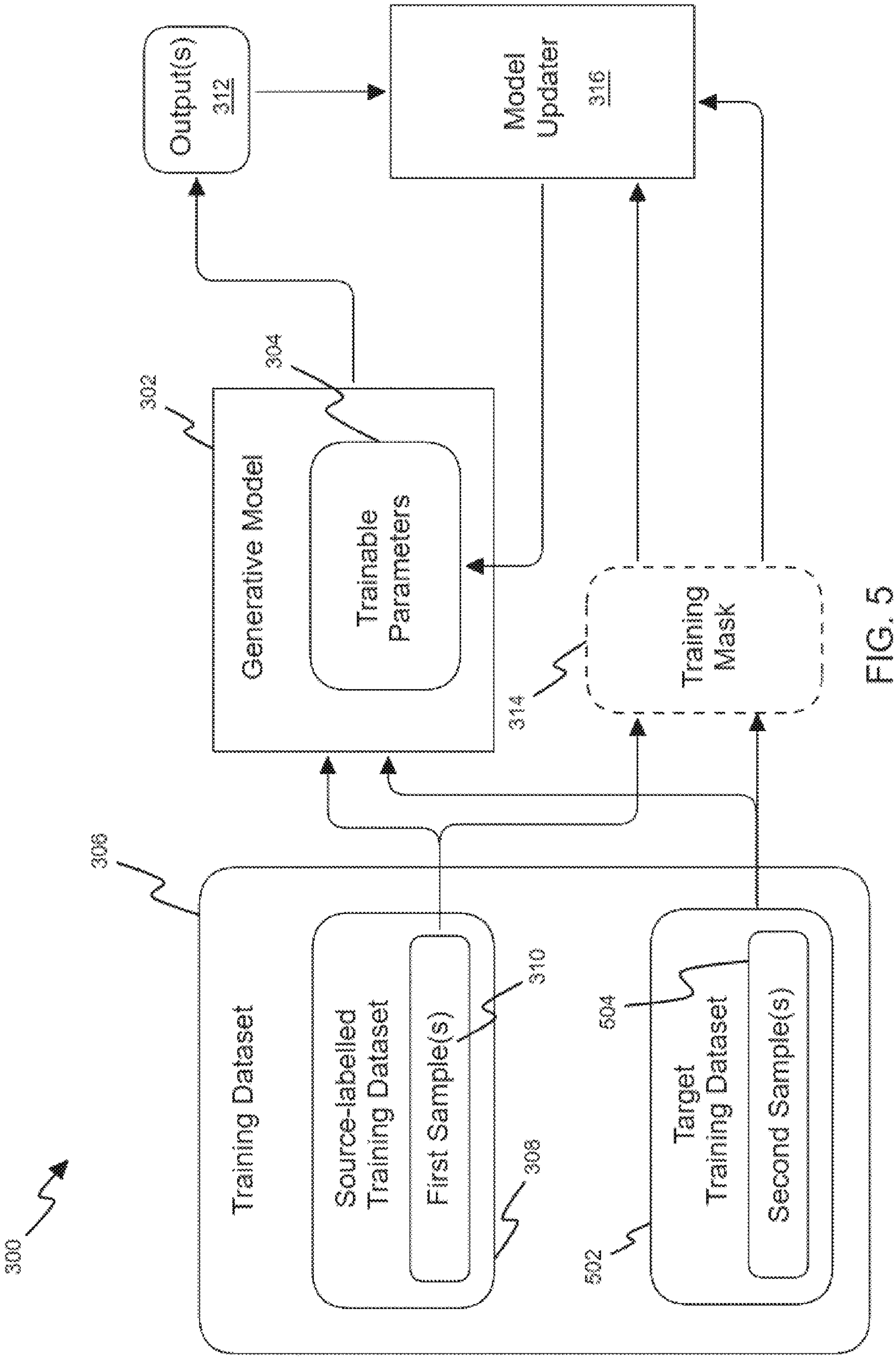
FIG. 5 is a block diagram showing a further example of a system in which the training dataset includes a target training dataset for target behaviour adaptation.

FIG. 5 is a block diagram illustrating a further example which may be implemented with any example of system 300, in which the training dataset 306 is augmented with a target training dataset 504 to support target behaviour adaptation via a null identifier.

The target training dataset 504 is a dataset introduced to teach the generative model 302 one or more target behaviours. Target behaviours may include, for example, an instruction-following behaviour, a target output tone, a target safety profile, an output verbosity level, a reasoning behaviour, or an output formatting constraint. The target training dataset 504 is typically smaller in scale than the source-labelled training dataset 308. The target training dataset 504 may be a subset of the broader training dataset 306, for instance comprising those samples from the existing mix that are judged to exhibit the highest quality or most representative target behaviour, or it may comprise subsequently received data that was not part of the original training mix. In some cases, samples appearing in the target training dataset 504 may also appear in the source-labelled training dataset 308, but without a source identifier; the same underlying prompt-response pair may therefore be presented to the generative model 302 twice during training, once with a source identifier and once with the null identifier.

Each second sample 506 within the target training dataset 504 is associated with a null identifier and exhibits one or more of the target behaviours described above. Each second sample 506 may, in some examples, comprise a desired response as well as an input prompt. The second sample(s) 506 may have the same, or substantially the same, form as the second sample(s) 118 discussed above, including any alternatives thereof.

Where the null identifier is realised as an explicit token, the training mask 314 (or a corresponding mask) may optionally be applied to the token positions corresponding to the null identifier token within the second samples 506, in the same manner as it is applied to the source identifier token positions within the first samples 310. This excludes the null identifier token positions from the loss calculation performed by the model updater 316, ensuring that the null identifier shapes the conditional generation behaviour of the generative model 302 without becoming a prediction target. Where the null identifier is instead realised as an absence of any token—that is, where the second samples 506 simply carry no prefix—the training mask 314 may not be applied to the second samples 506, since there are no identifier token positions to exclude.

The model updater 316 computes a respective loss for each of the first samples 310 and each of the second samples 506 based on the outputs 312 produced by the generative model 302 in response to the corresponding input prompts, and updates the trainable parameters 304 based on the combined respective losses. The loss for each sample is computed over the response token positions only, with identifier token positions excluded in accordance with the training mask 314 where applicable.

The methodology of FIG. 5 may be implemented using different approaches. In a first approach, the generative model 302 may trained on the first samples 310 for a main training phase. The main training phase may for example lasting $T_{main}$ steps. For example, samples may be source from a large-scale source datasets $\mathcal{S}=\{S_1, \ldots, S_N\}$. The source labelled training dataset 308 may be constructed as $$\mathcal{D}_{mix} \leftarrow \bigcup_{k=1}^{N} \{(c_k \oplus x, y) \mid (x, y) \in S_k\},$$

where $c_k$ represents a particular source identifier. Model parameters $\theta_{SFT}$ may then be updated by minimizing $\mathcal{L}_{\mathrm{Cond}}$ on $\mathcal{D}_{\mathrm{mix}}$ for $T_{main}$ steps (see also the discussion in relation to FIG. 1).

Subsequent to this training, the second samples 506 may be then introduced in a subsequent adaptation phase. This subsequent adaption phase may for example last n steps, where $n \ll T_{main}$, optionally mixed with a proportion of the first samples 310 for example to prevent forgetting of the source-conditioned distributions. For example, the target training database 504 may be constructed as $\mathcal{D}_{\mathrm{new}} \leftarrow \{\{(\emptyset \oplus x, y) \mid (x, y) \in S_{target}\}$, where $S_{target}$ represents a high-quality data target behaviour dataset. Where such second stage training uses a mixture of first and second samples, the training data set may be constructed as $\mathcal{D}_{\mathrm{final}} \leftarrow \mathcal{D}_{\mathrm{mix}} \cup \mathcal{D}_{\mathrm{new}}$. Model parameters $\theta_{SFT}$ may then be further updated by training on $\mathcal{D}_{\mathrm{final}}$ for n steps.

Such a staged approach may have the advantage of cleanly separating the source-conditioning phase from the target behaviour adaptation phase.

In a second approach, the first samples 310 and second samples 506 may be combined into a single training dataset from the outset, with appropriate mixing proportions between source-labelled and null-identifier samples, and the generative model 302 is trained on the combined dataset in a single phase. This joint training approach operationally simpler.

Training System for Target Behaviour Adaptation

Figure 6:
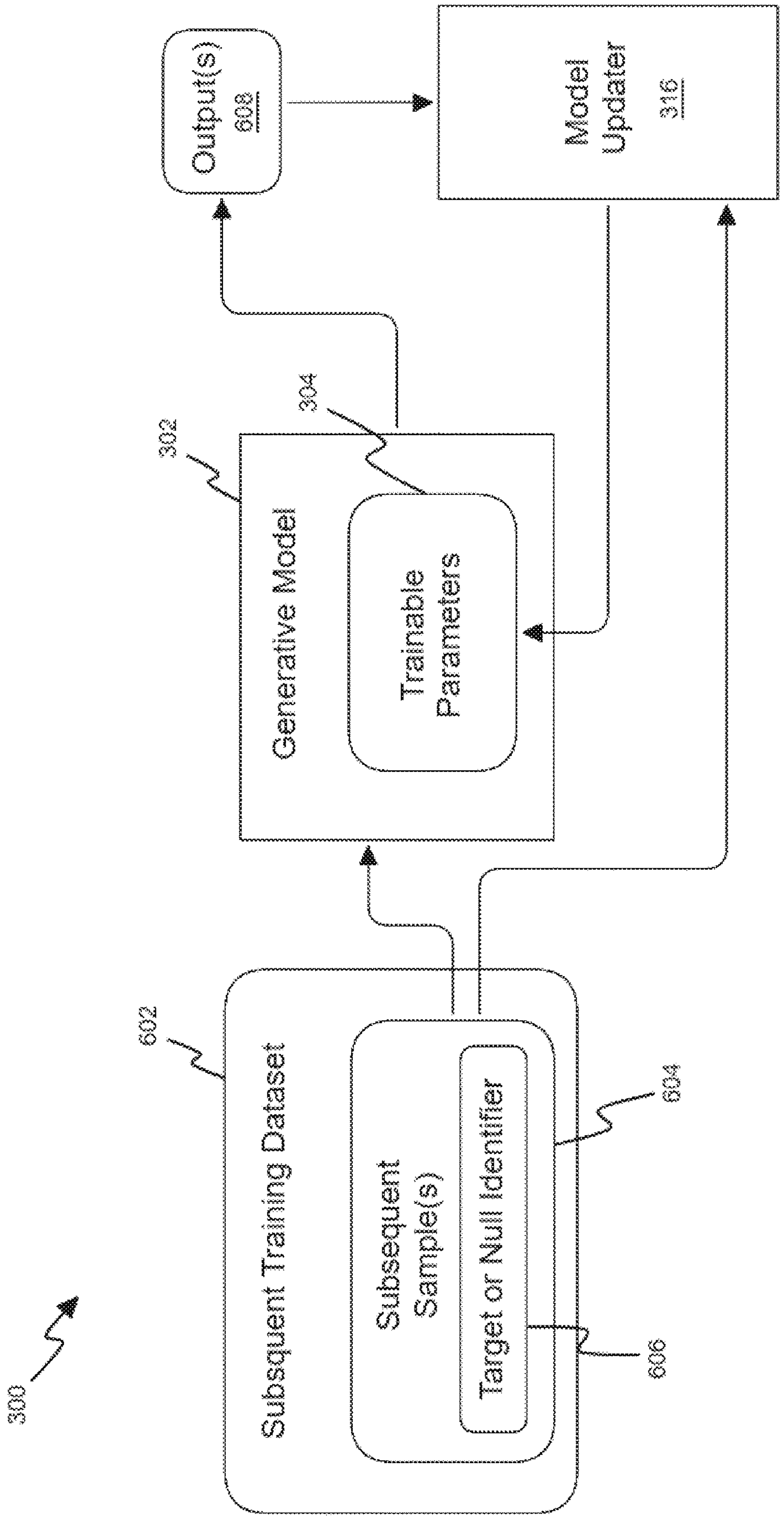
FIG. 6 is a block diagram showing a system for subsequently training a trained generative machine-learning model to learn a new target behaviour.

FIG. 6 is a block diagram illustrating a further example which may be implemented with any example of system 300 or system 100, in which the generative model 302 (or 102), which has already been trained via source-conditioned supervised fine-tuning as described in connection with earlier figures, undergoes a subsequent training stage to adapt its behaviour to a new target distribution. This subsequent training stage may enable efficient adaptation to new data distributions without requiring regeneration of the entire original training mix, thereby preventing mode locking to the new data and avoiding unpredictable regressions in previously learned behaviours.

The generative model 302 in FIG. 6 represents the trained machine-learning model produced by the earlier source-conditioned supervised fine-tuning process. The model carries trainable parameters 304 that were updated during that earlier stage and that are further updated during the subsequent training stage illustrated here. The generative model 302 receives the subsequent training dataset 602 as input and, in response to each sample therein, produces outputs 608—sequences of tokens generated by the model in response to the subsequent samples during this adaptation stage. These outputs 608 are passed to the model updater 316, which computes a training loss and updates the trainable parameters 304 accordingly. The processes used by the model updater 316 during this stage may be the same as or substantially similar to those employed during the earlier source-conditioned supervised fine-tuning stage, including the application of a training mask to exclude identifier token positions from the loss calculation.

The subsequent training dataset 602 is a new dataset introduced after the initial source-conditioned supervised fine-tuning stage has completed. Its total number of samples may typically be fewer (e.g., substantially fewer) than the total number of samples in the original training dataset used during the earlier fine-tuning stage. For example, the subsequent training dataset 602 may comprise only on the order of five thousand to ten thousand expert-generated samples, compared to the millions of samples present in the original training mix. This sample efficiency arises directly from the source-conditioned training approach: because the generative model 302 has already learned to disentangle task capabilities from source-specific priors across a broad range of distributions, it is able to rapidly acquire a new target behaviour from a small number of examples, without requiring the full original dataset to be regenerated or modified. For example, this subsequent training stage may considered to "distil" the performance or capabilities of a newly developed expert model back into the main generative model 302. By generating only a handful of high-quality samples (e.g., 5k-10k) from the new expert model and associating them with the null identifier 606, the generative model 302 may rapidly learn the new expert behaviour as its default, target mode, without the expense of regenerating millions of samples across all existing domains. Such approaches may reduce the computational cost of adapting the model to new behaviours relative to conventional retraining approaches.

The plurality of subsequent samples 604 are the individual training instances within the subsequent training dataset 602. Each subsequent sample 604 may exhibits a new target behaviour that was not present or emphasised in the original training mix. For example, the new target behaviour may be a newly desired response style, an updated instruction-following convention, or a capability introduced by a newly available expert model. Because the generative model 302 has been trained to recognise that distinct distributions correspond to distinct source identifiers, it is able to treat the subsequent samples 604 as a coherent new distribution and adapt to them efficiently, rather than treating them as noise or as an additional latent mode to be inferred from the input alone.

The target identifier 606 is an identifier associated with the plurality of subsequent samples 604. In some examples, the target identifier 606 comprises a null or empty identifier. By using the null identifier as the target identifier 606 for the subsequent training dataset 602, the generative model 302 learns to associate the new target behaviour with an unlocked, default state. During subsequent inference, a user prompt provided without any explicit source identifier (or with an explicit null identifier) may naturally trigger this default state, causing the generative model 302 to output the new target behaviour across all input domains. In this way, the model 302 may be quickly trained to exhibit new default target behaviours, without requiring full retraining with a full training dataset. Because the total number of samples in the subsequent training dataset 602 is far smaller than the number of samples in the original training mix, the number of gradient update steps required to complete this adaptation stage is correspondingly small, and the associated processor load, memory allocation, and total computational cycles are reduced relative to a full retraining of the model from the original dataset.

Alternatively or additionally, a particular named source identifier may be used as the target identifier 606 in place of the null identifier. This may be used where it is desired to associate the new target behaviour with an explicit, named conditioning signal rather than with the default null mode. For example, it may be used where it is desirable to be able to invoke the new behaviour selectively at inference time by supplying the corresponding identifier in the input prompt, whilst retaining a separate default mode associated with the null identifier. In this case, the target identifier 606 functions in the same way as the source identifiers used during the earlier fine-tuning stage: it provides a consistent, distinguishable conditioning signal that allows the generative model 302 to learn the conditional distribution associated with the new data, without that distribution interfering with the conditional distributions already learned for other source identifiers.

Reinforcement Learning on the Source-Conditioned Generative Model

Figure 7:
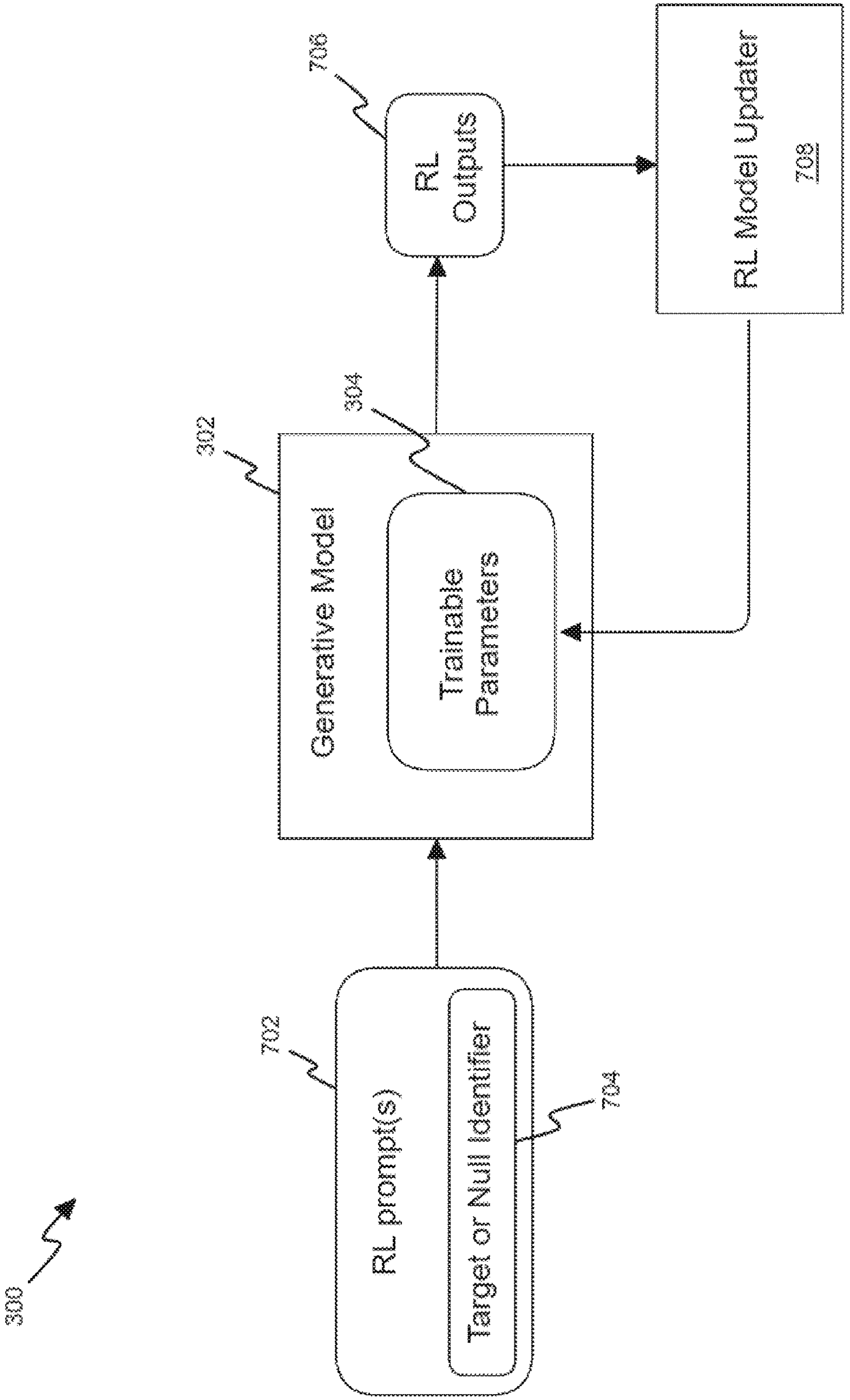
FIG. 7 is a block diagram showing a system for performing reinforcement learning on a trained generative machine-learning model.

FIG. 7 is a block diagram illustrating a further example which may be implemented with any example of system 300 or system 100, showing how the generative model 302 (or 102), having already been trained using source-conditioned supervised fine-tuning or retraining using any of the examples discussed above, may be subsequently subjected to a reinforcement learning stage. In particular, FIG. 7 illustrates the components and data flows involved in performing reinforcement learning on the trained generative model 302, and shows how the high token diversity preserved during the prior source-conditioned supervised fine-tuning stage may be leveraged to provide a stronger training signal and to prevent mode collapse during this subsequent stage.

Reinforcement learning, in the context of language model training, may refer to a class of optimisation procedures in which a policy, here the generative model 302, is updated to maximise a reward signal derived from evaluating its outputs. A variety of reinforcement learning algorithms may be used at this stage, including Direct Preference Optimisation (DPO), Proximal Policy Optimisation (PPO), Group Relative Policy Optimisation (GRPO), or any other approach. These algorithms differ in how they compute the reward or preference signal and how they constrain the policy update, but all share the common structure of generating output sequences from the current policy, evaluating those sequences, and updating the model parameters accordingly. In examples where DPO is used, for example, the update is guided by a preference loss computed over pairs of chosen and rejected outputs. In examples where PPO or GRPO is used, a scalar reward signal may be used to weight the policy gradient update. The choice of reinforcement learning algorithm does not affect the structural role of the components shown in FIG. 7, and the description below applies across these variants.

The generative model 302 shown in FIG. 7 is the same model introduced in FIG. 3. By this stage of the training pipeline, the generative model 302 has already been trained on both the source-labelled training dataset, in which each sample is associated with a respective source identifier, and the target training dataset, in which samples are associated with the null identifier. The internal weights of the generative model 302 at this stage correspond to the trainable parameters 304, which encode the conditional distributions learned across all source identifiers during supervised fine-tuning, as well as the target behaviour associated with the null identifier. During the reinforcement learning stage, the trainable parameters 304 continue to be updated, now in response to reward or preference signals rather than supervised targets.

The RL prompts 702 represent the input prompts supplied to the generative model 302 during the reinforcement learning stage. These prompts may be drawn from a variety of sources, including held-out portions of the supervised fine-tuning dataset, independently curated evaluation prompts, or prompts generated on-the-fly during training. The composition and origin of the RL prompts 702 may be selected to reflect the range of tasks and input domains over which the trained generative model 302 is intended to operate.

In some examples, each of the RL prompts 702 is associated with a target or null identifier 704. The target or null identifier 704 may be incorporated into the prompt in any of the ways described previously in connection with the source identifiers used during supervised fine-tuning—for example, as a token prepended to the input prompt, as a system-role instruction, or as a metadata tag. Where the RL prompts 702 are associated with the null identifier Ø, the generative model 302 generates output sequences conditioned on the null identifier, so that its generation draws for example on the parameters associated with both a first behaviour learned from a first data source and a second behaviour learned from a second, different data source. Because the null identifier was associated during supervised fine-tuning with a curated target dataset representing the desired intersection of capabilities across sources, conditioning on the null identifier at this stage may activate a generalised, domain-agnostic mode that synthesises the most desirable behaviours from across the full training mixture. This may act as a "best-of-all-worlds" conditioning signal, preserving the full diversity of the learned output distribution and ensuring that the rollout trajectories generated during reinforcement learning span a broad region of the output space (rather than the limited space mode locking may yield).

In other examples, the RL prompts 702 may instead be associated with a particular target source identifier—that is, a source identifier corresponding to a specific data source whose learned conditional distribution is to be activated. This may be useful, for example, where the reinforcement learning stage is intended to refine behaviour in a specific domain, or where generation guidance is used to steer the model towards a particular source's output distribution during rollout generation, with the source identifier subsequently removed for the purposes of computing the reinforcement learning loss. For example, a specific target source identifier may be selected randomly and added to a RL prompt 702 as generation guidance. By randomly sampling different source modes for generation, the reinforcement learning algorithm may be exposed to a wide diversity of potential responses for the same prompt. This may allow the RL model updater 708 to evaluate and dynamically distil the mode that best matches the prompt into the model's default behaviour. As will be appreciated, the full RL training set may use mixture of the null identifier and one or more source identifiers applied to respective samples.

The RL outputs 706 are the output sequences generated by the generative model 302 in response to the RL prompts 702. Because the generative model 302 has been trained using source-conditioned supervised fine-tuning, its output token distribution at this stage (using the null identifier) may retain a substantially higher entropy than would be observed in a model trained on the same heterogeneous dataset without explicit source conditioning. This preservation of token diversity may mean that when multiple output sequences are sampled per prompt, e.g., for preference comparison, those sequences are likely to differ more meaningfully from one another than in mode locked cases, exploring different behaviours, phrasings, and modes. The diversity of the RL outputs 706 may improve the quality of the training signal available to the reinforcement learning algorithm: a model whose output distribution has collapsed to a narrow mode may generate near-identical rollouts, providing weak or degenerate gradient information, whereas a model with high token diversity may generates rollout that span a broader region of the output space, enabling the reinforcement learning algorithm to identify and reinforce the most rewarding behaviours.

The RL model updater 708 receives the RL outputs 706 and evaluates them using a reinforcement learning algorithm to compute a reward or loss signal, which is then used to update the trainable parameters 304 of the generative model 302. The RL model updater 708 and the generative model 302 interact bidirectionally: the generative model 302 produces the RL outputs 706 that are consumed by the RL model updater 708 for evaluation, and the RL model updater 708 in turn updates the trainable parameters 304 of the generative model 302, thereby modifying its subsequent generation behaviour. The RL model updater 708 may apply any loss function as appropriate for the relevant RL algorithm. For example, a loss function may be formed to maximize reward R(y, x) while constraining divergence from $\pi_{ref}$, where $\pi_{ref}$ is the model trained by the conditioned SFT discussed above, prior to RL training.

Inference-Time Operation of the Trained Generative Model

Figure 8:
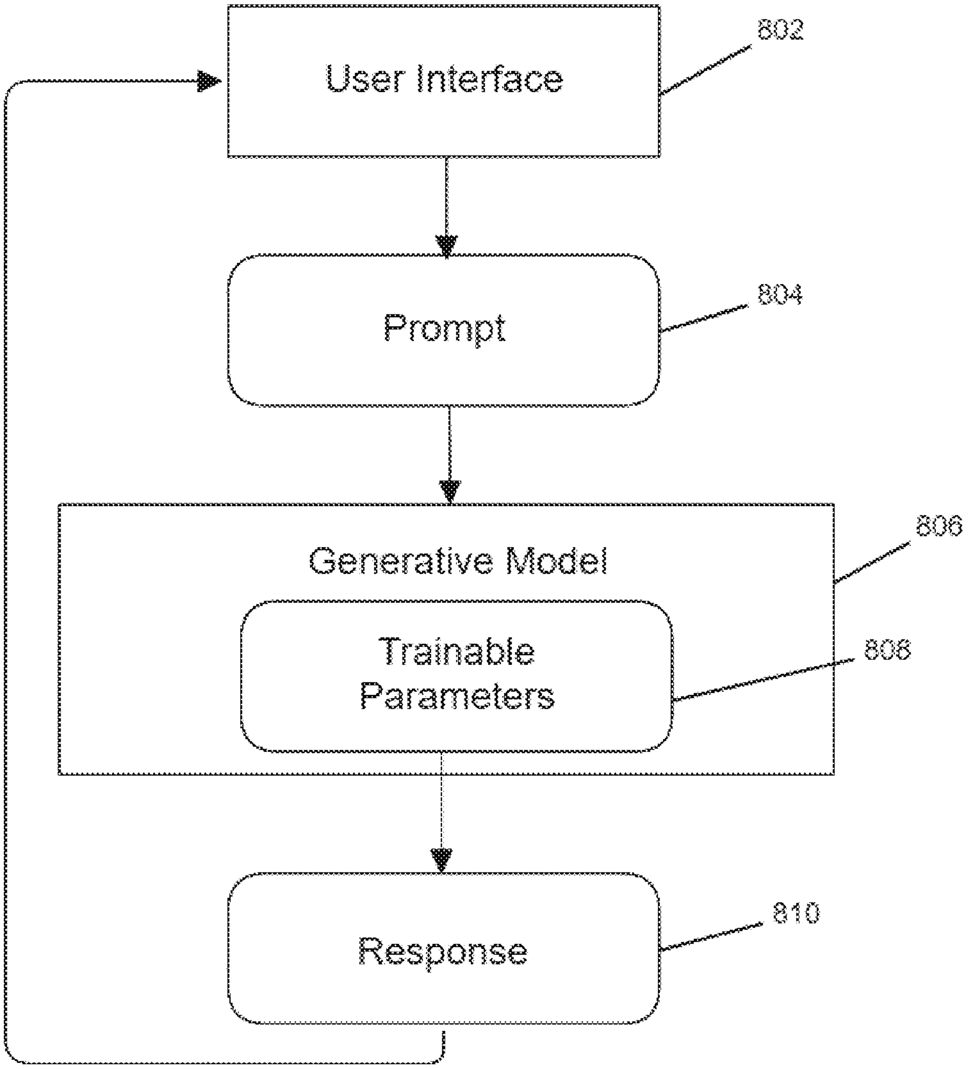
FIG. 8 is a block diagram showing a system for using a generative machine-learning model trained using source-conditioned supervised fine-tuning in inference.

FIG. 8 is a block diagram illustrating an inference-time view of a system 800, showing how the trained generative model may operates when deployed to respond to user inputs. The figure depicts the flow from a user interface 802 through an input prompt 804 to the generative model, which incorporates trainable parameters and produces a response.

During inference, a user supplies an input via the user interface 802. The user interface 802 may take any of a variety of forms, including a chat interface, an API endpoint, or an application-level integration, and serves as the point of entry through which for example, natural-language or structured inputs are received. The prompt 804 may be associated with a null identifier, or alternatively a specific source identifier.

The prompt 804 is passed to the generative model 806, which uses the prompt 804 as the basis for generating a response. The generative model 806 has a set of trainable parameters 808 whose values have been established through a training process as described elsewhere in the present disclosure. The generative model 806 generates a response 810 comprising a sequence of tokens. The response 810 is made accessible to the user via the user interface 802, as indicated by the connection from the response 810 back to the user interface 802, who may then supply a further input, initiating a subsequent iteration of the same flow.

Because the trainable parameters 808 of the generative model 806 reflect training signals derived from source-labelled datasets and target datasets associated with a null identifier, the deployed model may be better equipped to apply target behaviours across all input domains. Training with explicit source conditioning exposes the model to disentangled task capabilities and source-specific priors, allowing the parameters to encode the target behaviour in an unlocked state. This may enable the generative model 806 to perform tasks while exhibiting desired target behaviors, such as instruction-following or a target output tone, more reliably across diverse domains than a model whose parameters were shaped by heterogeneous data without explicit source conditioning.

It will be appreciated that the architecture depicted in FIG. 8 is not limited to text-modality generative models. The generative model may in principle be any generative machine-learning model trained according to the source-conditioned procedures, including models operating over other modalities. Similarly, the user interface 802 is not limited to any particular implementation, and the input prompt 804 may be constructed programmatically rather than supplied directly by a human user.

The source-conditioned training procedure prevents mode locking by ensuring that the model learns explicit conditional distributions over source-specific behaviours, parameterised by the source identifier tokens, rather than implicitly partitioning its latent space according to input domain. This disentanglement means that no rigid association forms between a particular input domain and a particular behavioural mode, so the model remains capable of generalising across domains at inference time.

System Architecture for Source-Conditioned Supervised Fine-Tuning

Figure 9:
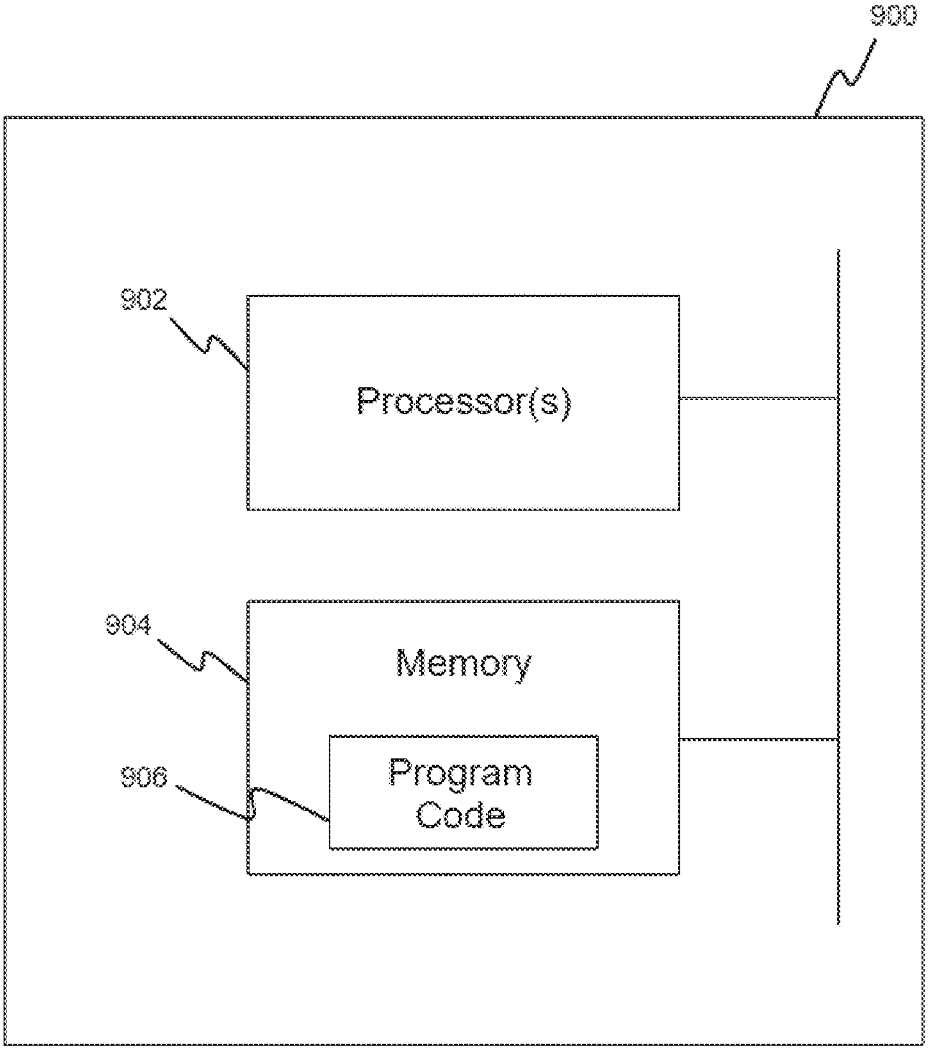
FIG. 9 is a block diagram showing an example computer system, including a processor and memory, that may be used to implement any of the methods and operations described herein.

FIG. 9 is a block diagram illustrating an example system 900 that may be used to implement any of the methods and operations described herein, including receiving training datasets, generating source-labelled datasets, training generative machine-learning models using source identifiers and null identifiers, applying training masks, and updating trainable parameters based on calculated losses.

The system 900 comprises at least one processor 902 and memory 904. The memory 904 holds program code (instructions) 906, which when executed by the at least one processor 902, cause the at least one processor 902 to carry out any of the operations discussed in this disclosure. The at least one processor 902 and memory 904 are communicatively coupled, as shown by the connection between the two components in FIG. 9.

The at least one processor 902 may be any processing hardware suitable for executing the program code 906. In examples, the at least one processor 902 comprises one or more graphics processing units (GPUs), such as those manufactured by NVIDIA Corporation® or Advanced Micro Devices, Inc.®, which are well-suited to the parallel matrix operations that underlie transformer-based generative language model inference and training. In other examples, the at least one processor 902 may comprise one or more tensor processing units (TPUs), such as those developed by Google LLC®, or other application-specific integrated circuits (ASICs) designed for machine learning workloads. The at least one processor 902 may additionally or alternatively comprise one or more central processing units (CPUs), for example to handle orchestration, data loading, and other general-purpose operations that accompany model training. In practice, the at least one processor 902 may be distributed across multiple physical machines, for example in a compute cluster or cloud computing environment, with inter-processor communication handled via high-bandwidth interconnects such as NVLink® or InfiniBand®.

The memory 904 may comprise any form of non-transitory computer-readable storage, including random-access memory (RAM), such as high-bandwidth memory (HBM) or GDDR memory located on or near the at least one processor 902, as well as secondary storage such as solid-state drives (SSDs) or hard disk drives (HDDs). In practice, the memory 904 may include a combination of these, for example with model parameters and active computation residing in high-speed on-device memory during training and inference, while datasets, checkpoints, and generation logs are held in larger-capacity secondary storage. The memory 904 may also be distributed, for example using a networked file system or distributed object storage, to accommodate the large parameter counts and training data associated with source-conditioned supervised fine-tuning workloads.

The program code 906 stored on the memory 904 represents the instructions that, when executed by the at least one processor 902, implement the operations of the system 900. The program code 906 may be written in or compiled from one or more programming languages and may make use of machine learning frameworks such as PyTorch, JAX, or TensorFlow, which provide automatic differentiation and distributed training capabilities. In particular, these frameworks support training processes including the computation of conditional negative log-likelihood losses and policy gradient updates. The program code 906 may further implement data formatting, training mask application, reinforcement learning algorithms, and parameter updating operations as described elsewhere in this disclosure. The same program code 906 may be executed on GPUs, TPUs, ASICS, CPUs, or combinations thereof, without modification to the underlying training logic, making the approach deployable across a range of hardware configurations.

The following clauses set out various combinations of features described above and in connection with the figures.

1. A system comprising: one or more processors; and memory storing instructions which, when executed, cause the one or more processors to perform operations comprising: receiving a training dataset comprising a plurality of samples of different data sources, each sample of the plurality of samples comprising an input prompt and a corresponding response; generating a source-labelled training dataset, comprising associating a respective source identifier token with each of a plurality of first samples of the training dataset, each respective source identifier token indicating a respective data source of the respective first sample; generating a target training dataset, comprising associating a null identifier with a plurality of second samples of the training dataset, the plurality of second samples exhibiting a target behaviour; training, in a supervised fine-tuning training stage, a generative machine-learning model using the source-labelled training dataset and the target training dataset, wherein training the generative machine-learning model comprises: providing the input prompts of each of the plurality of first samples including the respective source identifier tokens as inputs to the generative machine-learning model; and providing the input prompts of each of the plurality of second samples including the null identifier as inputs to the generative machine-learning model; calculating a respective loss for each of the plurality of first samples and each of the plurality of second samples, wherein the respective loss for a respective sample is based on the output generated by the generative machine-learning model for the input prompt of that respective sample and on the response of that respective sample; and updating parameters of the generative machine-learning model based on the respective losses; wherein, in inference, the trained generative machine-learning model is configured to receive an input associated with the null identifier to generate an output exhibiting the target behaviour.

2. The system of clause 1, the operations further comprising performing reinforcement learning on the trained generative machine-learning model using a plurality of output sequences generated based at least in part on providing inputs associated with the null identifier to the generative trained machine-learning model.
3. The system of clause 1 or clause 2, wherein: the plurality of different data sources comprise one or more of: human annotation; a source model; or a source model class; and/or a total number of samples in the target training dataset is fewer than a total number of samples in the source-labelled training dataset.
4. The system of any of clause 1 to 3, wherein the null identifier comprises a null identifier token or an absence of a source identifier token.
5. The system of any of clause 1 to 4, wherein the operations further comprise applying a training mask to exclude, from loss calculation, token positions corresponding to the respective source identifier tokens.
6. A computer-implemented method comprising: receiving a training dataset comprising a plurality of first samples each associated with a respective source identifier indicating a data source of each said first sample; and training, in a post-training stage, a machine-learning model using the training dataset, wherein the machine-learning model is a generative model, and wherein training the machine-learning model comprises: providing input prompts of the plurality of first samples including the respective source identifiers as inputs to the machine-learning model; calculating a respective loss for each of the plurality of first samples, wherein the respective loss for a respective first sample is based on the output generated by the machine-learning model for the input prompt of that respective first sample and on a response of that respective first sample; and updating parameters of the machine-learning model based on the respective losses.
7. The method of clause 6, wherein the post-training stage is a supervised fine-tuning stage.
8. The method of clause 6 or clause 7, wherein the training dataset further comprises a plurality of second samples each associated with a null identifier, the plurality of second samples associated with one or more target behaviours; and wherein the operations comprise: training the machine-learning model using the plurality of second samples.
9. The method of clause 8, comprising: receiving a subsequent training dataset comprising a plurality of subsequent samples; associating an identifier with the plurality of subsequent samples; and further training the trained machine-learning model using the subsequent training dataset to condition outputs of the machine-learning model on the identifier, wherein a total number of samples in the subsequent training dataset is fewer than a total number of samples in the training dataset.
10. The method of clause 9, wherein the identifier comprises the null identifier, and wherein the plurality of subsequent samples are associated with a new target behaviour.
11. The method of any of clauses 8 to 10, comprising: performing reinforcement learning on the trained machine-learning model using an output sequence generated based at least in part on providing an input associated with the null identifier or a target source identifier to the trained machine-learning model.
12. The method of clause 11, wherein one or more of: (a) providing the input associated with the null identifier causes the trained machine-learning model to generate the output sequence based at least in part on parameters of the machine-learning model associated with a first behaviour of a first data source and a second behaviour of a second, different data source; and/or (b) the input is associated with the target source identifier, and performing the reinforcement learning comprises updating parameters of the trained machine-learning model based at least in part on the output sequence and the input without the target source identifier.
13. The method of any of clauses 8 to 12, wherein the null identifier comprises one or more of: an absence of a source identifier; a token prepended to, appended to, or embedded within an input prompt of a second sample of the plurality of second samples; a system-role instruction; a metadata tag; an observed control variable; or a latent embedding.
14. The method of any of clauses 8 to 13, wherein the training dataset comprises a plurality of domain-specific samples exhibiting a first behaviour, and wherein the null identifier is configured to cause the machine-learning model to apply the one or more target behaviours to an input prompt corresponding to the plurality of domain-specific samples in place of the first behaviour.

15 The method of any of clauses 8 to 14, wherein the one or more target behaviours comprises one or more of: an instruction-following behaviour; a target output tone; a target safety profile; an output verbosity level; a reasoning behaviour; or an output formatting constraint.

16 The method of any of clauses 8 to 15, wherein training the machine-learning model using the plurality of second samples comprises: training the machine-learning model using a mixture comprising the plurality of first samples and the plurality of second samples; and/or subsequently training the machine-learning model using the plurality of second samples after training the generative machine-learning model using the plurality of first samples.

17. The method of any of clauses 6 to 16, wherein training the machine-learning model comprises: applying a training mask to exclude, from loss calculation, one or more token positions corresponding to the respective source identifiers; calculating a respective loss for each of the plurality of first samples and each of the plurality of second samples; and updating parameters of the machine-learning model based at least in part on the respective losses.
18. The method of any of clauses 6 to 17, wherein: each source identifier comprises one or more of: a token prepended to, appended to, or embedded within an input prompt of the corresponding first sample; a system-role instruction; a metadata tag; a control variable; or a latent embedding; and/or each source identifier indicates one or more of: an identity of a specific machine-learning model; an identity of a specific human annotator; a human-derived data category; a class of machine-learning models sharing a target capability or distribution characteristic; a descriptive persona defining a behavioural profile of the data source; a data quality tier; or a generation parameter defining an output tone or verbosity.

Any of clauses 6 to 18 may further or alternatively be combined with the operations in any of clauses 1 to 5.

19. A computer-implemented method comprising: receiving an input prompt associated with a null identifier or a source identifier; and processing the input prompt using a machine-learning model to generate an output exhibiting a target behaviour; wherein the machine-learning model has been trained by the method of any of clauses 6 to 18, and/or based on the operations in any of clauses 1 to 5.

20. The method of clause 19, wherein the input prompt corresponds to a specific data domain, the specific data domain associated with a first behaviour in the training dataset, and wherein processing the input prompt using the machine-learning model generates the output exhibiting the target behaviour in place of the first behaviour.

What is claimed is:

1. A system comprising:

one or more processors; and memory storing instructions which, when executed, cause the one or more processors to perform operations comprising:

receiving a training dataset comprising a plurality of samples of different data sources, each sample of the plurality of samples comprising an input prompt and a corresponding response;

generating a source-labelled training dataset, comprising associating a respective source identifier token with each of a plurality of first samples of the training dataset, each respective source identifier token indicating a respective data source of the respective first sample;

generating a target training dataset, comprising associating a null identifier with a plurality of second samples of the training dataset, the plurality of second samples exhibiting a target behaviour;

training, in a supervised fine-tuning training stage, a generative machine-learning model using the source-labelled training dataset and the target training dataset, wherein training the generative machine-learning model comprises:

providing the input prompts of each of the plurality of first samples including the respective source identifier tokens as inputs to the generative machine-learning model; and providing the input prompts of each of the plurality of second samples including the null identifier as inputs to the generative machine-learning model;

calculating a respective loss for each of the plurality of first samples and each of the plurality of second samples, wherein the respective loss for a respective sample is based on the output generated by the generative machine-learning model for the input prompt of that respective sample and on the response of that respective sample; and updating parameters of the generative machine-learning model based on the respective losses;

wherein, in inference, the trained generative machine-learning model is configured to receive an input associated with the null identifier to generate an output exhibiting the target behaviour.

2. The system of claim 1, the operations further comprising performing reinforcement learning on the trained generative machine-learning model using a plurality of output sequences generated based at least in part on providing inputs associated with the null identifier to the trained generative machine-learning model.

3. The system of claim 1, wherein:

the plurality of different data sources comprise one or more of: human annotation; a source model; or a source model class; or a total number of samples in the target training dataset is fewer than a total number of samples in the source-labelled training dataset.

4. The system of claim 1, wherein the null identifier comprises a null identifier token or an absence of a source identifier token.

5. The system of claim 1, wherein the operations further comprise applying a training mask to exclude, from loss calculation, token positions corresponding to the respective source identifier tokens.

6. A computer-implemented method comprising:

receiving a training dataset comprising a plurality of first samples each associated with a respective source identifier indicating a data source of each said first sample; and training, in a post-training stage, a machine-learning model using the training dataset, wherein the machine-learning model is a generative model, and wherein training the machine-learning model comprises:

providing input prompts of the plurality of first samples including the respective source identifiers as inputs to the machine-learning model;

calculating a respective loss for each of the plurality of first samples, wherein the respective loss for a respective first sample is based on the output generated by the machine-learning model for the input prompt of that respective first sample and on a response of that respective first sample; and updating parameters of the machine-learning model based on the respective losses.

7. The method of claim 6, wherein the post-training stage is a supervised fine-tuning stage.

8. The method of claim 6, wherein the training dataset further comprises a plurality of second samples each associated with a null identifier, the plurality of second samples associated with one or more target behaviours; and wherein the method further comprises:

training the machine-learning model using the plurality of second samples.

9. The method of claim 8, comprising:

receiving a subsequent training dataset comprising a plurality of subsequent samples;

associating an identifier with the plurality of subsequent samples; and further training the trained machine-learning model using the subsequent training dataset to condition outputs of the machine-learning model on the identifier, wherein a total number of samples in the subsequent training dataset is fewer than a total number of samples in the training dataset.

10. The method of claim 9, wherein the identifier comprises the null identifier, and wherein the plurality of subsequent samples are associated with a new target behaviour.

11. The method of claim 8, comprising:

performing reinforcement learning on the trained machine-learning model using an output sequence generated based at least in part on providing an input associated with the null identifier or a target source identifier to the trained machine-learning model.

12. The method of claim 11, wherein one or more of:

(a) providing the input associated with the null identifier causes the trained machine-learning model to generate the output sequence based at least in part on parameters of the machine-learning model associated with a first behaviour of a first data source and a second behaviour of a second, different data source; or (b) the input is associated with the target source identifier, and performing the reinforcement learning comprises updating parameters of the trained machine-learning model based at least in part on the output sequence and the input without the target source identifier.

13. The method of claim 8, wherein the null identifier comprises one or more of:

an absence of a source identifier;

a token prepended to, appended to, or embedded within an input prompt of a second sample of the plurality of second samples;

a system-role instruction;

a metadata tag;

an observed control variable; or a latent embedding.

14. The method of claim 8, wherein the training dataset comprises a plurality of domain-specific samples exhibiting a first behaviour, and wherein the null identifier is configured to cause the machine-learning model to apply the one or more target behaviours to an input prompt corresponding to the plurality of domain-specific samples in place of the first behaviour.

15. The method of claim 8, wherein the one or more target behaviours comprises one or more of:

an instruction-following behaviour;

a target output tone;

a target safety profile;

an output verbosity level;

a reasoning behaviour; or an output formatting constraint.

16. The method of claim 8, wherein training the machine-learning model using the plurality of second samples comprises:

training the machine-learning model using a mixture comprising the plurality of first samples and the plurality of second samples; or subsequently training the machine-learning model using the plurality of second samples after training the machine-learning model using the plurality of first samples.

17. The method of claim 8, wherein training the machine-learning model comprises:

applying a training mask to exclude, from loss calculation, one or more token positions corresponding to the respective source identifiers;

calculating a respective loss for each of the plurality of first samples and each of the plurality of second samples; and updating parameters of the machine-learning model based at least in part on the respective losses.

18. The method of claim 6, wherein:

each source identifier comprises one or more of: a token prepended to, appended to, or embedded within an input prompt of the corresponding first sample; a system-role instruction; a metadata tag; a control variable; or a latent embedding; or each source identifier indicates one or more of: an identity of a specific machine-learning model; an identity of a specific human annotator; a human-derived data category; a class of machine-learning models sharing a target capability or distribution characteristic; a descriptive persona defining a behavioural profile of the data source; a data quality tier; or a generation parameter defining an output tone or verbosity.

19. A computer-implemented method comprising:

receiving an input prompt associated with a null identifier or a source identifier; and processing the input prompt using a machine-learning model to generate an output exhibiting a target behaviour;

wherein the machine-learning model has been trained by:

receiving a training dataset comprising a plurality of first samples each associated with a respective source identifier indicating a data source of each said first sample; and training, in a post-training stage, the machine-learning model using the training dataset, wherein the machine-learning model is a generative model, and wherein training the machine-learning model comprises:

providing input prompts of the plurality of first samples including the respective source identifiers as inputs to the machine-learning model;

calculating a respective loss for each of the plurality of first samples, wherein the respective loss for a respective first sample is based on the output generated by the machine-learning model for the input prompt of that respective first sample and on a response of that respective first sample; and updating parameters of the machine-learning model based on the respective losses.

20. The method of claim 19, wherein the input prompt corresponds to a specific data domain, the specific data domain associated with a first behaviour in the training dataset, and wherein processing the input prompt using the machine-learning model generates the output exhibiting the target behaviour in place of the first behaviour.

* * * * *